(12) United States Patent
LaFlamme et al.

(10) Patent No.: US 7,997,454 B2
(45) Date of Patent: Aug. 16, 2011

(54) METERING DISPENSING SYSTEM WITH IMPROVED VALVING TO PREVENT ACCIDENTAL DISPENSING OF LIQUID THEREFROM

(75) Inventors: Roger J. LaFlamme, Enfield, CT (US); Robert J. Mileti, Torrington, CT (US)

(73) Assignee: Sealed Air Corporation (US), Elmwood Park, NJ (US)

( * ) Notice: Subject to any disclaimer, the term of this patent is extended or adjusted under 35 U.S.C. 154(b) by 727 days.

(21) Appl. No.: 11/951,351

(22) Filed: Dec. 6, 2007

(65) Prior Publication Data

US 2008/0264972 A1  Oct. 30, 2008

Related U.S. Application Data

(60) Provisional application No. 60/914,243, filed on Apr. 26, 2007.

(51) Int. Cl.
*B65D 37/00* (2006.01)
(52) U.S. Cl. .................................. 222/207; 222/213
(58) Field of Classification Search .............. 222/207, 222/206, 213, 214, 209, 182, 335, 581, 632, 222/633, 212, 183, 105, 380
See application file for complete search history.

(56) References Cited

U.S. PATENT DOCUMENTS

| | | | |
|---|---|---|---|
| 886,984 A | 5/1908 | Jopling | |
| 1,217,054 A | 2/1917 | Pearman | |
| 1,941,745 A | 1/1934 | Higley | |
| 2,714,475 A | 8/1955 | Roehrich | |
| 2,855,127 A | 10/1958 | Lerner et al. | |
| 3,223,289 A | 12/1965 | Bouet | |
| 3,396,419 A | 8/1968 | Richter et al. | |
| 3,507,586 A * | 4/1970 | Kutik et al. | 417/480 |
| 3,617,139 A | 11/1971 | Ross | |
| 3,752,366 A * | 8/1973 | Lawrence, Jr. | 222/207 |
| 3,820,689 A * | 6/1974 | Cocita | 222/207 |

(Continued)

FOREIGN PATENT DOCUMENTS

DE  4030851  4/1992

(Continued)

OTHER PUBLICATIONS

Stephen & Lawyer, Inc., Reticulated Foam, http://www.steplaw.com/reticulatedfoam.html.

(Continued)

*Primary Examiner* — Lien T Ngo
(74) *Attorney, Agent, or Firm* — St. Onge Steward Johnston & Reens LLC

(57) ABSTRACT

A liquid dispensing device includes a storage container and dome pump mechanism attached thereto for metered dispensing. A one-way valve is employed to pull liquid from the storage container into the dome for metering. An exit passageway serves as an output valve. Each time the dome pump housing is depressed, a substantially equal volume of fluid is dispensed from the container. To prevent accidental dispensing, the one-way valve in the dome pump remains normally open and unsealed to allow backflow of liquid back into the storage container pouch when pressure is placed on the dome. The user squeezes the dome and base plate together to seal the one-way valve to urge liquid out through the exit port for actual dispensing. Also, interior pouch force creates backflow through the exit port back into the containment chamber to further prevent leakage.

18 Claims, 10 Drawing Sheets

U.S. PATENT DOCUMENTS

| | | | |
|---|---|---|---|
| 3,949,137 A | 4/1976 | Akrongold et al. | |
| 3,981,106 A | 9/1976 | Gallo | |
| 4,004,854 A | 1/1977 | Breer, II | |
| 4,074,944 A | 2/1978 | Xavier | |
| 4,098,434 A | 7/1978 | Uhlig | |
| 4,124,316 A | 11/1978 | O'Rourke | |
| 4,127,515 A | 11/1978 | MacRae et al. | |
| 4,188,989 A | 2/1980 | Andersen | |
| 4,560,375 A * | 12/1985 | Schulte et al. | 604/9 |
| 4,702,397 A | 10/1987 | Gortz | |
| 4,753,006 A | 6/1988 | Howe | |
| 4,760,642 A | 8/1988 | Kwak | |
| 4,809,432 A | 3/1989 | Schauble | |
| 4,886,388 A | 12/1989 | Gulker et al. | |
| 4,888,868 A | 12/1989 | Pritchard | |
| 4,889,441 A | 12/1989 | Tice | |
| 4,890,744 A | 1/1990 | Lane, Jr. et al. | |
| 4,993,594 A | 2/1991 | Becker et al. | |
| 5,014,427 A | 5/1991 | Byrne | |
| 5,016,351 A | 5/1991 | Drahus | |
| 5,074,765 A | 12/1991 | Pekar | |
| 5,114,255 A | 5/1992 | Villarreal | |
| 5,168,628 A | 12/1992 | Mock et al. | |
| 5,176,510 A | 1/1993 | Nilsson | |
| 5,261,570 A | 11/1993 | Hippely et al. | |
| 5,265,772 A | 11/1993 | Bartasevich et al. | |
| 5,303,851 A | 4/1994 | Libit et al. | |
| 5,337,478 A | 8/1994 | Cohen et al. | |
| 5,353,961 A | 10/1994 | Debush | |
| 5,356,039 A | 10/1994 | Christine et al. | |
| 5,372,487 A | 12/1994 | Pekar | |
| 5,387,207 A | 2/1995 | Dyer et al. | |
| 5,441,345 A | 8/1995 | Garvey et al. | |
| 5,482,980 A | 1/1996 | Pcolinsky | |
| 5,505,341 A | 4/1996 | Gueret | |
| 5,555,673 A | 9/1996 | Smith | |
| 5,564,190 A | 10/1996 | Fleetwood | |
| 5,640,737 A | 6/1997 | Boggs | |
| 5,700,245 A | 12/1997 | Sancoff et al. | |
| 5,701,674 A | 12/1997 | Mitchell | |
| 5,704,723 A | 1/1998 | Salisian | |
| 5,761,813 A | 6/1998 | Frick et al. | |
| 5,836,482 A | 11/1998 | Ophardt et al. | |
| 5,842,607 A | 12/1998 | Snider | |
| 5,855,066 A | 1/1999 | Manager | |
| 5,865,554 A | 2/1999 | Lin | |
| 5,934,296 A | 8/1999 | Clay | |
| 5,944,032 A | 8/1999 | Masterson | |
| 5,950,928 A | 9/1999 | Giang et al. | |
| 5,983,500 A | 11/1999 | da Silva | |
| 6,183,154 B1 | 2/2001 | Coe | |
| 6,210,064 B1 | 4/2001 | White et al. | |
| 6,251,098 B1 | 6/2001 | Rake et al. | |
| 6,302,607 B1 | 10/2001 | Burrowes et al. | |
| 6,394,316 B1 | 5/2002 | Daansen | |
| 6,406,207 B1 | 6/2002 | Wiegner et al. | |
| 6,419,118 B1 | 7/2002 | Rees et al. | |
| 6,558,629 B1 | 5/2003 | Davidson | |
| 6,623,201 B2 | 9/2003 | Brumlik | |
| 6,629,799 B2 | 10/2003 | Flores, Jr. | |
| 6,641,307 B2 | 11/2003 | Matsuda et al. | |
| 6,715,952 B1 | 4/2004 | Aiken et al. | |
| 6,754,958 B2 | 6/2004 | Haws et al. | |
| 6,789,321 B2 | 9/2004 | Simms | |
| 6,789,706 B2 | 9/2004 | Abergel et al. | |
| 6,843,368 B1 | 1/2005 | Frutin | |
| 6,883,563 B2 | 4/2005 | Smith | |
| 6,886,254 B1 | 5/2005 | Pennella | |
| 6,910,274 B1 | 6/2005 | Pennella et al. | |
| 6,925,716 B2 | 8/2005 | Bressler et al. | |
| 6,929,155 B1 | 8/2005 | Sayers | |
| 6,964,097 B2 | 11/2005 | Franzini et al. | |
| 6,996,908 B2 | 2/2006 | Orloff et al. | |
| 7,043,841 B2 | 5/2006 | Franzini et al. | |
| 7,121,754 B2 | 10/2006 | Bressler et al. | |
| 7,137,203 B2 | 11/2006 | Bressler et al. | |
| 7,137,531 B2 | 11/2006 | Arghyris et al. | |
| 7,156,132 B2 | 1/2007 | O'Dougherty et al. | |
| 7,159,742 B2 | 1/2007 | Lee | |
| 2001/0025859 A1 | 10/2001 | Dumont | |
| 2001/0025860 A1 | 10/2001 | Auer | |
| 2002/0085873 A1 | 7/2002 | Katsandres et al. | |
| 2003/0077106 A1 | 4/2003 | Weihrauch | |
| 2003/0121936 A1 | 7/2003 | De Laforcade | |
| 2004/0092864 A1 | 5/2004 | Boehm, Jr. et al. | |
| 2004/0140326 A1 | 7/2004 | Smart et al. | |
| 2004/0177510 A1 | 9/2004 | Pennella | |
| 2004/0178284 A1 | 9/2004 | Fahy et al. | |
| 2005/0138814 A1 | 6/2005 | Pennella et al. | |
| 2005/0144785 A1 | 7/2005 | Bressler et al. | |
| 2005/0199651 A1 | 9/2005 | Laflamme et al. | |
| 2006/0072858 A1 | 4/2006 | Kurosawa et al. | |
| 2006/0150386 A1 | 7/2006 | Wanli et al. | |
| 2006/0254056 A1 | 11/2006 | Coffin et al. | |
| 2006/0255068 A1 | 11/2006 | Genosar | |
| 2006/0272154 A1 | 12/2006 | Brevard | |
| 2007/0017098 A1 | 1/2007 | Bressler et al. | |
| 2007/0084058 A1 | 4/2007 | Szczepanowski et al. | |
| 2007/0214646 A1 | 9/2007 | Bezdek | |
| 2008/0277427 A1 * | 11/2008 | Rossignol | 222/207 |
| 2009/0032554 A1 * | 2/2009 | Laidler et al. | 222/207 |

FOREIGN PATENT DOCUMENTS

| | | |
|---|---|---|
| DE | 29719331 | 12/1997 |
| DE | 29818058 | 1/1999 |
| FR | 2628394 A1 | 9/1989 |
| FR | 2683759 | 11/1991 |
| GB | 2083142 A | 3/1982 |
| JP | 6293348 | 10/1994 |
| JP | 10165668 | 6/1998 |
| JP | 2005199020 | 7/2005 |
| WO | 0176972 A1 | 10/2001 |
| WO | 0176974 A1 | 10/2001 |
| WO | 02071907 A1 | 9/2002 |
| WO | 2004096504 | 7/2003 |
| WO | 2005086852 A2 | 9/2005 |

OTHER PUBLICATIONS

3M Worldwide, Scotch-Brite Urethane Laminate 325HK 5 Pieces/Pack 72 Packs/Case, http://products3.3m.com/catalog/hk/en009/home_leisure/-/node_H16XQM6PDVgs/root_B...

Plastic Bags for You, Pouch (zipper & non zipper), flat pouch, stand up pouch, with and without valve, with and without window, plain & preprinted, paper bag, etc., http://plasticbagsforyou.com/PRODUCTS/pouch-group.html.

* cited by examiner

METERING DISPENSING SYSTEM WITH IMPROVED VALVING TO PREVENT ACCIDENTAL DISPENSING OF LIQUID THEREFROM

CROSS-REFERENCE TO RELATED APPLICATIONS

This application is related to and claims priority from earlier filed provisional patent application Ser. No. 60/914,243, filed Apr. 26, 2007.

BACKGROUND OF THE INVENTION

This invention relates generally to dispensing devices and packages. More specifically, the present invention relates to metering devices that can controllably dispense fluid media from a source of fluid media, such as a liquid.

Various types of fluid material and media are employed for different purposes through commerce and industry. For example, there are various products in the personal care, home care, air care, transportation care, and food industries that require some type of dispensing of a fluid material from a source of such material. When this material is sold in commerce, it must be contained and stored in some type of container. When that product is used, it must be dispensed from its storage container to a location for use.

In the prior art, there are many different types of dispensers for delivering fluid material. For example, a flexible container body with a nozzle tip is commonly provided for such a purpose. An application of such use is for the dispensing of ketchup where the container body is squeezed by the user to urge the fluid material out from the nozzle tip accurately to a desired location. The amount of fluid delivered is determined by the how much the user squeezed the container body. However, this yields erratic results where more or less fluid material is delivered on each successive squeeze of the container body. Also, the container must be held upright to avoid leakage because no valves are employed.

In another example of a prior art dispensing device, a flexible container holds a volume of fluid material to be delivered. A single one-way check valve is provided as an exit port from the flexible container. When the flexible body is squeezed, the material is urged out under pressure through the valve.

There has also been a desire to not only dispense the fluid material but also to help apply them, such as to a surface. In the prior art, squeezable container bodies have been equipped with some type of applicator head for this purposes. For example, in the personal care industry, body wash devices commonly include some type of squeezable container body and an abrasive applicator material, such as a fabric or foam, applied thereon. Thus, when the fluid material is present outside the container body, the applicator assists in spreading the material on the body of the user by spreading the fluid for more even distribution thereof. Applicators are particularly useful for even distribution in personal care industry, such as for the application of shoe polish, to ensure a quality, even and smooth coat.

There have been attempts in the prior art to provide a dispenser that can easily deliver fluid material to an applicator positioned about a container body. These prior art devices employ, for example, spring-loaded buttons that open up an exit port in the main container body to permit flow to an outer applicator material layer. This is in contrast to requiring the user to squeeze the entire body of the container. However, these devices are incapable of delivering a substantially equal dose of fluid at each dispensing operation because they simply open up the container body and permit the fluid to flow to the applicator material by gravity. As a result, the fluid material must exit at a lower side of the container. Therefore, it is not possible to dispense fluid on more than one side of the container or in a direction opposite to that of gravity. To dispense fluid material without concern for gravity, squeezable container bodies must be employed in the prior art that have all of the disadvantages, as described above.

There is a general desire to be able to attach a metering device to any location and in any fashion to a package, vessel or pouch that contains the material to be dispensed so that the pumped material is directed toward a desired location. For example, it may be desirable to locate the pumping metering device on the top of the device and to provide exit tubing or conduit through the body of the pouch or vessel so that the material exits on the opposing side of the pouch or vessel. Cleaning sponges, for example, are well suited for this configuration where the metering pumping mechanism is located on the top of the sponge while the metering material exits on the opposing side of the sponge, namely, the opposite surface that mates with the surface to be cleaned.

Also, there is a desire to configure a metering pumping mechanism that includes the metering pump and the exit port on the exterior of the surface of the pouch or vessel that contains the material to be dispensed. In certain environments, such as stand-up gusseted pouches, printed vessels, reclosable zipper pouches, pouches with tear notches and punch holes have a need for an improved metering dispensing system.

There is also a particular need in the prior art for a dispensing device that is capable of preventing inadvertent or accidental dispensing of liquid. There is a need for a dispenser that requires the user to manipulate the dispenser in a specific way in order to successfully dispense liquid therefrom. There is also a need for a dispenser construction that can remain substantially free of leaks and unwanted dispensing when not in use.

SUMMARY OF THE INVENTION

The present invention preserves the advantages of prior art dispensing devices. In addition, it provides new advantages not found in currently available devices and overcomes many disadvantages of such currently available devices.

The invention is generally directed to a novel and unique dispenser for delivering substantially equal metered doses of fluid material upon each dispensing operation with an optional applicator for even distribution of the dispensed fluid material. The present invention provides a new and unique valving construction that prevents inadvertent or accidental dispensing of liquid from the storage pouch of the dispenser even when pressure is accidentally or inadvertently applied to the pump portion of the dispenser.

The fluid dispensing device of the present invention includes a container with an interior fluid storage region therein. A flexible metering housing is disposed in fluid communication with the fluid storage region with a first one-way valve disposed between the container and the flexible metering housing. One-way flow from the interior fluid storage region of the container fills the predetermined volume of the metering chamber with fluid by vacuum action when the flexible metering housing is depressed and then released. A second valve is in fluid communication with the metering housing output port and permits fluid flow from the metering chamber to the exterior outer region of the container when the metering housing is depressed again. Each time the metering housing is depressed a substantially equal volume of fluid is dispensed from the container. An additional applicator layer, such as a foam layer, may be provided on the outside of container to facilitate dispersion and delivery of the fluid.

The present invention includes a new and unique valving configuration that controls the flow of fluid within the device. More specifically, a base plate, with an aperture therethrough, is positioned between a liquid storage region and a pumping device. The base plate is preferably slightly convex. Resting above the aperture and within the cavity of the dome is a flapper valve of thin film construction. The flapper valve may be configured to be in a normally open configuration. As long as the plate with the aperture remains convex and the flapper valve remains open, the flapper valve does not seal against the aperture. As a result, any inadvertent contact with the dome pump or storage container will not result in the dispensing of the product but, instead, a flow of product from the dome back through the inlet aperture to the reservoir within the pouch container itself. However, when it is desired to actually dispense the product, the user's thumb depresses the dome and the user's index finger inverts the base plate from convex to concave, with the assistance of the application of force against stand-off legs located underneath the dome pump and stand-off legs underneath the base plate, such that the flapper valve closes and actually seals the aperture thereby closing the passage back into the reservoir of the pouch. As a result, liquid flows through the one-way outlet valve of the pouch for intended dispensing.

Also, the present invention provides a metering dispensing system that can be mounted to the exterior of a vessel, such as a pouch or container, to dispense the material therein in a dosed fashion. The exterior configuration of the present invention enables the dispensing system to be used in certain environments that are not suitable for routing dispensed material on an side opposite to the pumping mechanism.

It is therefore an object of the present invention to provide a fluid dispensing device that can deliver a substantially equal volume of fluid material from each dispensing operation.

Another object of the present invention is to provide a fluid dispensing device that prevents inadvertent or accidental dispensing of liquid from the storage container when pressure is inadvertently or accidentally applied to the dome pumping mechanism or storage container of the dispenser.

It is a further object of the present invention to provide a fluid dispensing device that is insensitive to gravity.

It is a further object of the present invention to provide a fluid dispensing device that includes an applicator to ensure even delivery of the fluid material.

Another object of the present invention is to provide a fluid dispensing device that can deliver fluid flow at any point from the device.

It is a further object of the present invention to provide a fluid dispensing device that can deliver fluid flow at multiple locations from the device.

It is yet a further object of the present invention to provide an exterior metering dispensing system.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
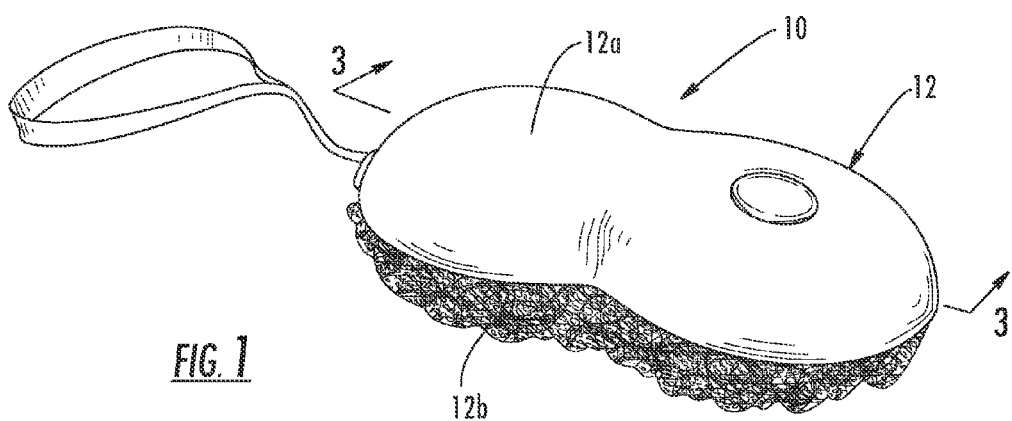
FIG. 1 is a top perspective view of a first embodiment of the dispensing device of the present invention.
Figure 2:
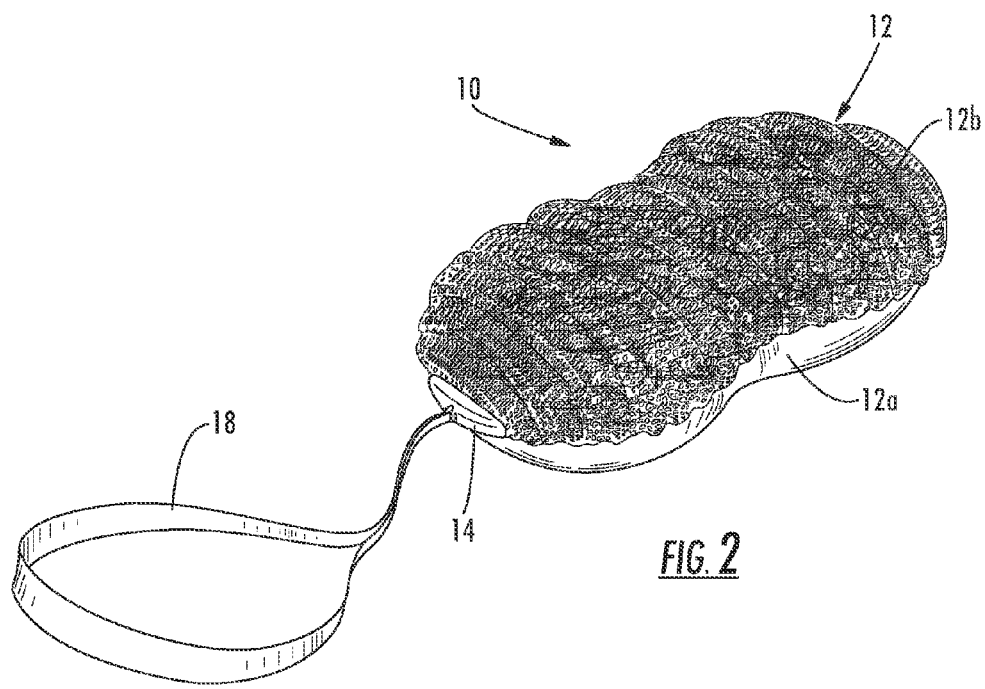
FIG. 2 is a bottom perspective view of the dispensing device of FIG. 2.

Referring first to FIGS. 1 and 2, the dispensing device 10 of the present invention is shown to include an outer covering, generally referred to as 12 which serves as an applicator material. This applicator material 12b can be formed of any type of material to suit the application at hand. For example, as seen in FIGS. 1 and 2, the cover 12 is preferably formed of two different types of material 12a, 12b to serve two purposes when in use. Preferably, the top section 12a is of a foam material while the bottom section 12b is of a mesh or "pouf" material. The top section 12a can be secured to the bottom section 12b by, for example, welding. A snap-fit cover 14 seals a re-fill port 16, as will be described in more detail in connection with FIG. 3. A hang strap or cord 18 can also be provided. The configuration of the applicator 12 is just one of many different types of applications of the present invention which will be discussed in more detail below. It is also possible that applicator materials 12a, 12b can be omitted if the intended purpose of the device is to only dispense fluid rather than to dispense and also assist in applying it.

Figure 3:
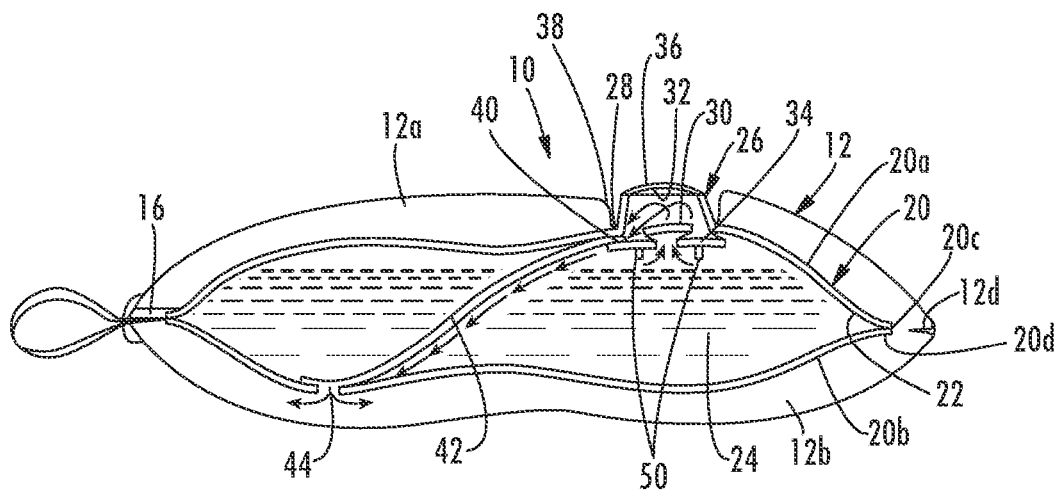
FIG. 3 is a cross-sectional view through the line 3-3 of FIG. 1.

Turning now to FIG. 3, a cross-sectional view through the line 3-3 of FIG. 1 is shown to illustrate the internal construction of an embodiment of the dispensing device 10 of the present invention. A container body 20 is provided which includes a fluid storage region 22 that contains a volume of fluid material 24 therein. The container 20 is preferably made of a flexible material, such as plastic or nylon. Thus, as fluid material 24 is evacuated from within the container body 20, it will collapse gradually for a compact structure.

A metering housing 26 is provided at a first opening 28 of the container body 20. The metering housing 26 includes an intake one-way valve 30, such as a check valve, to pull fluid 24 from the fluid storage region 22 of the container body 20 into a metering chamber 32 of a predetermined size. Any type of valve can be used to suit the given application. For example, a different embodiment of the valve construction is discussed in detail below in connection with FIGS. 10-15. Still referring to FIG. 3, the intake valve 30 is positioned in a base plate 34 of the metering housing 26. Thus, fluid 24 can only flow in one direction, namely, from the fluid storage region 22 into the metering chamber 32. The metering chamber 32 is defined by a flexible membrane 36 in the form of a button or bulb which is accessible and manipulateable through a gap 38 in the applicator material 12. The button 36, which is also known as a dome pump, may be clear to provide an indicator to the consumer when the metered dosage of fluid material 24 is ready for delivery.

An output valve 40 is provided in fluid communication with the metering chamber 32 of the metering housing 26. Thus, the fluid residing in the metering chamber can only exit through the output valve 40. Also, a fluid conduit 42 is also provided to direct the exit of fluid 24 at any location through the container body. Preferably, as seen in FIG. 3, the fluid conduit 42 connects the output valve 40 of the metering housing 26 to an exit port 44 located on the bottom of the container body. This permits the metering housing 26 to be on an opposite side as the side through which the fluid 24 exits. The fluid conduit 42 can be directed and located to exit at any point through the container body 20 depending on the application at hand. Also, the output valve 40 may be located at the exit port 44, as an alternative depending on the requirements of the application. The output valve 40 may be a flattened tube of material or two portions of material secured together. The latter can be readily seen in FIGS. 10-15, as will be described in further detail below.

Referring back to FIG. 3, the operation of the dispensing device 10 is further explained. The button 36 of the metering housing 26 is depressed to initiate a vacuum operation. More specifically, when the button 36 is further released, fluid 24 is pulled from the fluid storage region 22 of the container body 20 into the metering chamber 32 which is configured to be of a certain known volume. The act of releasing the button 36 fills the metering chamber 32 to substantial capacity. Thus, a metered amount of fluid material 24 is contained within the metering chamber 32 in preparation for delivery. The size of the metering chamber 32 can be selected according to the type of fluid material 24 to be dispensed and the application therefor and the desired dosage volume.

Further depression of the button or dome pump 36 urges the measured volume of fluid 24 within the metering chamber 32 out through the output valve 40 of the metering housing 26. This known amount of fluid material 24 is then either directly routed to an optional applicator 12 for use or through a fluid conduit 42, as seen in FIG. 3, for more targeted introduction into the applicator 12. In this case, it is preferred that the metered volume of fluid material 24 be routed to the bottom of the container body 20 for dispersion into the applicator portion 12b on the bottom surface thereof. For example, this configuration is particularly well-suited for dispensing body wash for bathing purposes. Other applications may require different exit and introduction locations into the applicator material 12. For example, the exit location of the liquid may be on the same side of the device 10 as the dome pump. This is particularly useful when the device 10 is intended solely for dispensing fluid without the use of an applicator 12.

Figure 4:
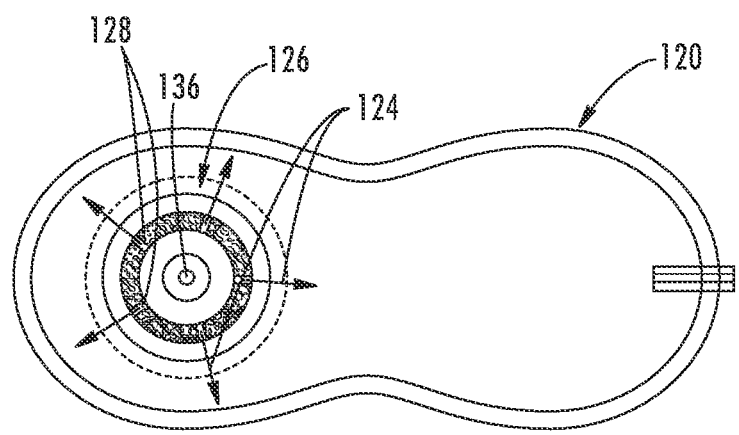
FIG. 4 is a top plan view of an alternative embodiment of the present invention.

In FIG. 4, an alternative construction of the container 120 with modified metering housing 126 is shown. In this embodiment, an array of output valves 128 is positioned radially about the periphery of the metering housing 126 to deliver fluid material 124 directly to the applicator material (not shown in FIG. 4 for ease of explanation) on the same side thereof without employing a fluid conduit 42 that is routed through the interior of the container body 20. This radial delivery pattern is well-suited for use in application devices requiring simultaneous dispersion of contents around the metering housing, such as for applying skin conditioner.

Figure 5:
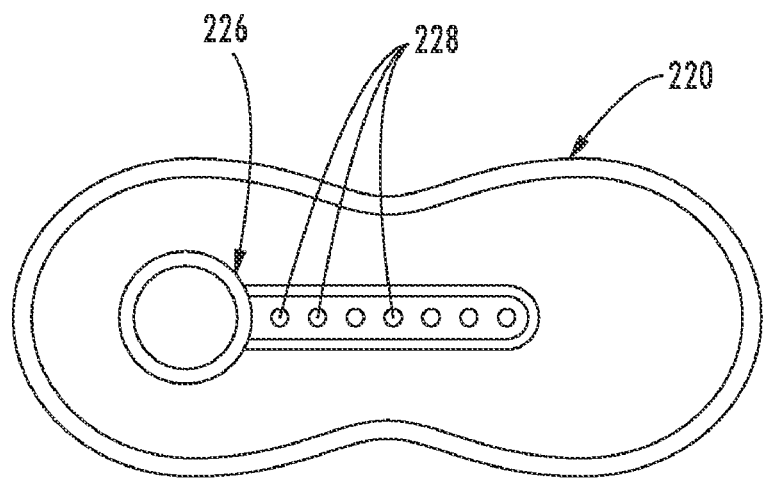
FIG. 5 is a top plan view of another alternative embodiment of the present invention.

Still further, FIG. 5 illustrates another alternative construction of a container 220 with modified metering housing 226 of the present invention where an array of output valves 228 is positioned linearly across the top surface of the container body 220 to deliver fluid material directly to the applicator material (not shown in FIG. 5 for ease of explanation) on the same side thereof without employing a fluid conduit. This linear delivery pattern is well-suited for use as an applicator that applies fluid in a linear stroke-based manner along the longitudinal axis of the device.

In accordance with the present invention, the direction of the delivery of the fluid material 24 can be easily modify to suit the application at hand. In certain applications, it is desirable that the applicator material 12, located on the top and the bottom of the container body 20, receive fluid material in an evenly distributed fashion. As shown above, the fluid material 24 can be directed out from any location on the container 20 to deliver the fluid as desired. It is frequently desirable that the fluid 24 be able to passively flow from one side 20a of the container 20 to the opposing side 20b of the container 20, particularly at the edges 20c thereof.

Referring back to FIG. 1, an efficient method of manufacturing a quality dispensing device 10 is to employ heat welding to construct the container 20 and the applicator material 12 thereon. For example, a top portion 20a is typically heat welded to a bottom portion 20b about their periphery 20c to form a container 20 with an interior fluid storage region 22 therein. The applicator material 12 is similarly secured to the container 20 by heat welding or other similar processes, such as gluing, either about its periphery or its entire contact surface with the container 20.

Use of a heat welding seam 20d about the periphery 20c of the container 20 is employed to reduce the flow and wicking action of the fluid 24 in the applicator material 12a on one side to the applicator material 12b on the other side and vice versa. Thus, fluid 24 must travel over the seam 20d of the container and seam 12d of the applicator material 12 to be present on the opposing side. This seam 12d, 20d prevents the fluid 24 from freely flowing from the front of the container 20 to the back and vice versa.

Figure 6:
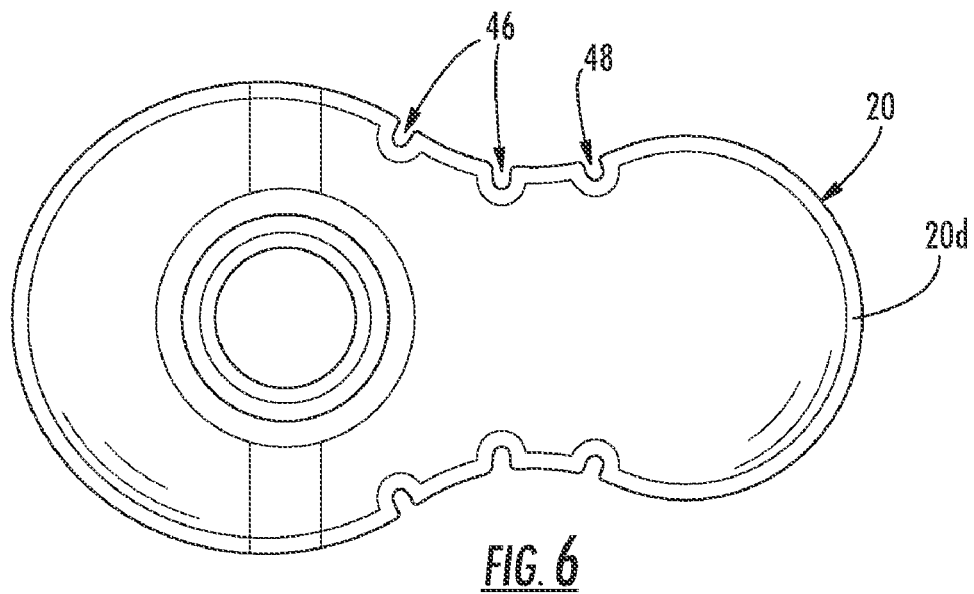
FIG. 6 is a top plan view of another embodiment of the dispensing device of the present invention showing flow enhancing notches.

FIG. 6 illustrates a further modification to the container 20 which is within the scope of the present invention to address the problem indicated above. More specifically, a number of notches 46 are formed in the peripheral edge 20d of the container 20 to permit flow of fluid material 24 easily from one side of the container 20 to the other. When the applicator material 12 is heat sealed to the container at its peripheral edge to form a seam 12d, a number of pass-through apertures 48 are formed between the seam 20d, 12d and the applicator material 12 to permit free flowing travel of fluid material 24 from one side of the device 10 to the other and back without having to travel over the peripheral seam 12d, 20d.

The applicator material 12 can be foam, such as open cell foam, fabric, blended material, co-extruded material and combinations thereof. It should be understood that these materials are just examples of the types of materials that can be used in connection with the dispenser 10 of the present invention. The specific material is determined by the given application and the type of material to be dispensed.

Thus, when fluid material 24 is dispensed within the foam, the fluid 24 will tend to equilibrate the moisture by moving the moisture from a point of high moisture to a point of low moisture. This wicking action causes the fluid 24 to naturally propagate through the applicator material 12. Since there is an absence of applicator material 12 at the periphery, the notches 46 and pass-through apertures 48 of FIG. 6, facilitates the wicking action from one side of the device 10 to the other, if necessary in that application.

Non-woven materials or fibers may also be employed as the material for the applicator 12 on one or both sides of the device. For example, reticulated foam may also be employed. These materials are well-suited as applicators 12 for more harsh chemicals, such as tire cleaner and paint remover where toughness is required. Also, more abrasive material can be provided on one side of the device for more aggressive cleaning, for example, while the opposing side has a polishing type surface.

In general, the size, density and wicking action of the cells and overall size of the applicator 12 can be modified to suit the particular fluid to be applied. The foregoing applicators can be incorporated into any of the embodiments of the present invention regardless of whether the material exits on the same side of the container 20 as the pump, as in FIGS. 10-15, or on an opposite side thereof, as in FIGS. 1-3.

Figure 7:
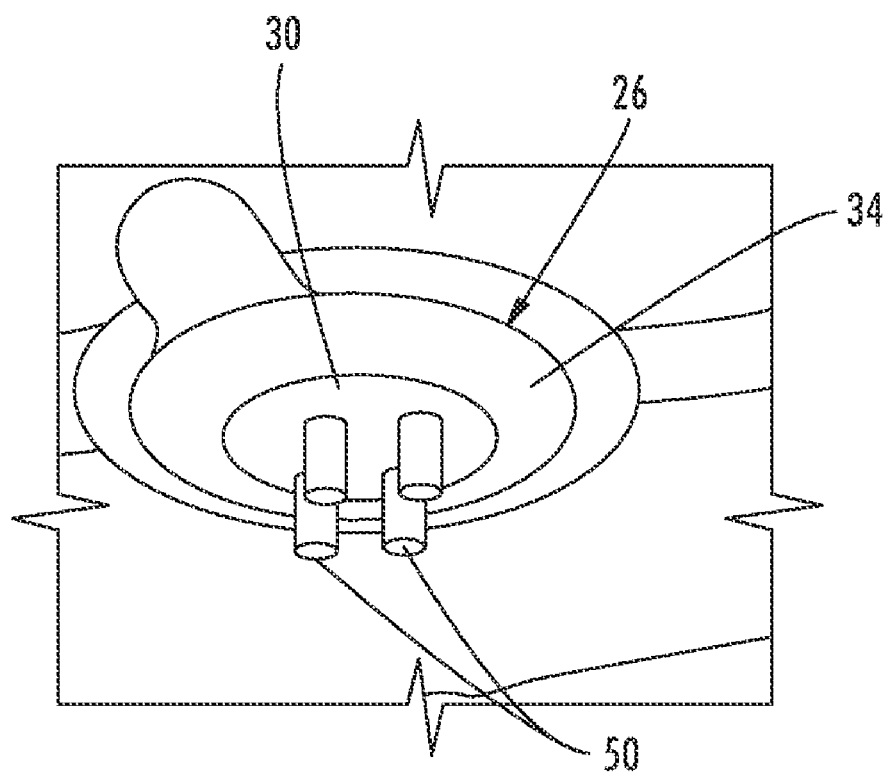
FIG. 7 is a close-up perspective view of the metering housing with stand-off legs on the bottom of the dividing plate of the pumping mechanism.
Figure 8:
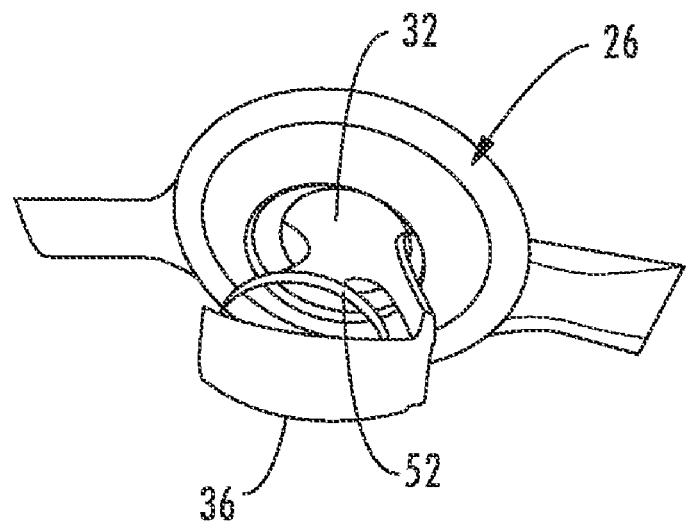
FIG. 8 is a close-up perspective view of the metering housing with coil spring.

Turning now to FIGS. 1, 7 and 8, further enhancements to the metering housing 26 construction are shown in detail. As seen in FIGS. 1 and 7, a number of stand-off legs 50 emanate downwardly from the base plate 34 of the metering housing 26. These legs 50 prevent the base plate 34 from completely bottoming out and blocking flow of fluid material 24 into the intake valve 30. The stand-off legs 50 are particularly useful when the volume of fluid material 24 left in the container 20 is running low and the container 20 is becoming relative flat in configuration. In this situation, there is a possibility that the aforesaid bottoming out may occur. However, the use of the stand-off legs 50 of FIGS. 1 and 7 prevent this from occurring.

FIG. 8, with reference back to FIG. 1, illustrates a further modification of the metering housing 26 to ensure that maximum suction is achieved and that the entire metering chamber 32 is filled upon each depression and release of the button 36. A spring-biasing structure 52 resides within the button or bulb structure 36 of the metering housing 26. Thus, the button 36 recovers quickly while providing a strong suction or vacuum to fill the interior of the metering chamber 32 with the desired metered volume of fluid material 24. A coil spring is preferred for the spring-biasing structure 52 but other spring-biasing structures, such as leaf springs and foam material, may be employed for this purpose.

Figure 9:
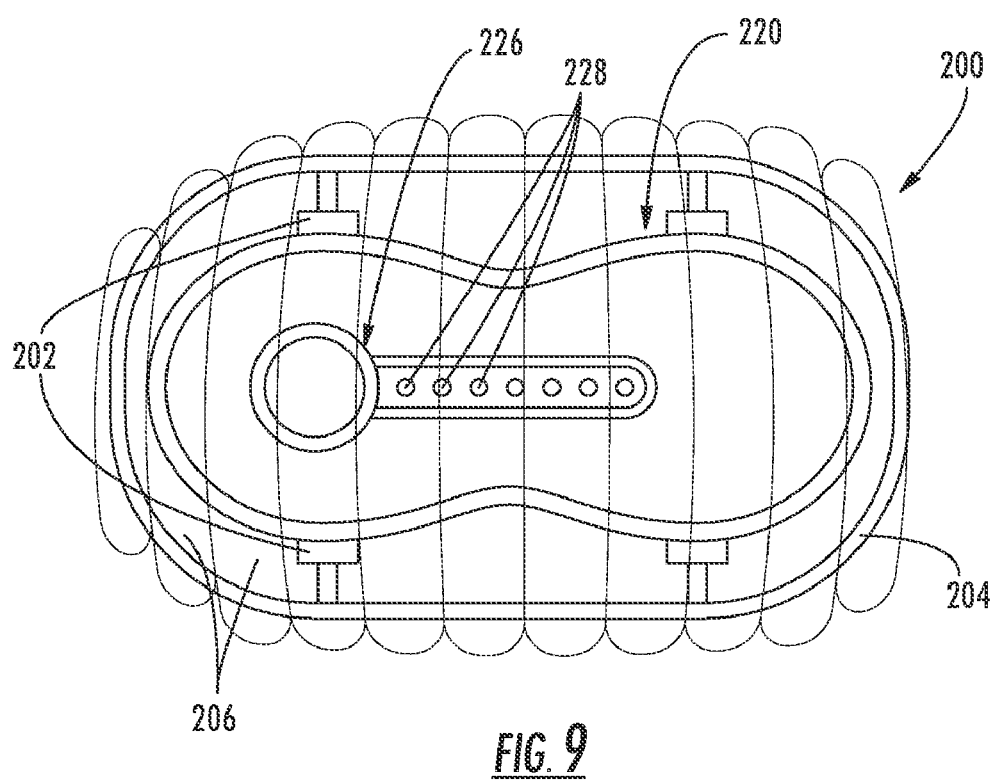
FIG. 9 is a top plan view of another alternative embodiment of the present invention.

FIG. 9 illustrates yet a further alternative embodiment 200 of the present invention where a container, such as container 220 or 120, includes a series of tabs 202 that emanate outwardly from the container 220. An outer frame or skeleton 204 is connected to the container 220 via the tabs 202. Applicator material 206, such as "poof" or fabric material, is then attached to the frame 204 with the container 220 residing therein. This embodiment 200 is particularly well-suited to permit free flowing of fluid material about the dispenser 200.

Figure 10:
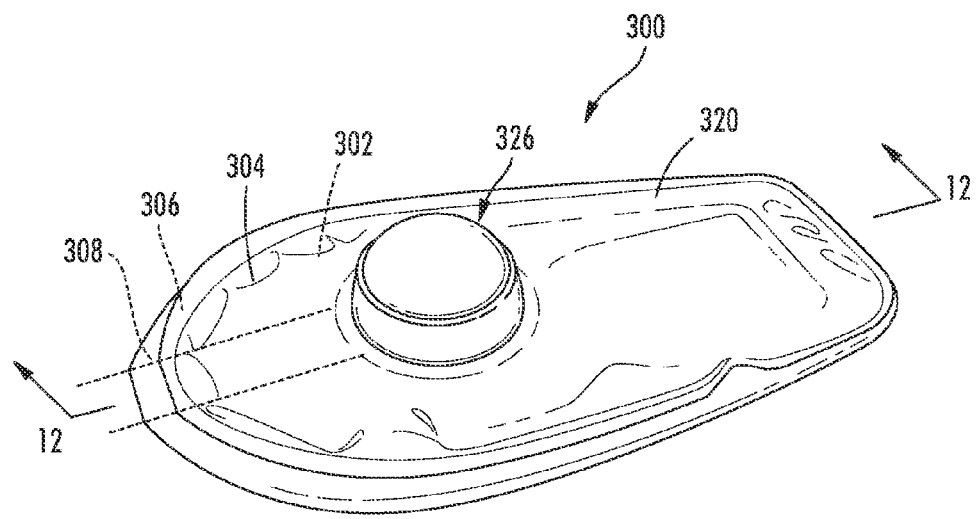
FIG. 10 is a perspective view of another embodiment of the metering dispensing system of the present invention that includes improved valving to prevent the inadvertent or accidental dispensing of liquid therefrom.

Turning now to FIGS. 10-15, details are shown of a device 300 that includes the improved valving of the present invention that prevents inadvertent or accidental dispensing of liquid 302 even when pressure is placed on the dome pump 326 or storage container 320. FIG. 10 illustrates a perspective view of a metering dispenser 300 that employs the improved valving in accordance with the present invention. An outer storage container 320 is provided that may be formed of two sheets of material 304, 306 secured together, such as by welding, or a tube of material. A metering pump, generally referred to as 326, pulls liquid 302 from the storage container 320, meters it, and then dispenses it via an exit port 308.

Figure 11A:
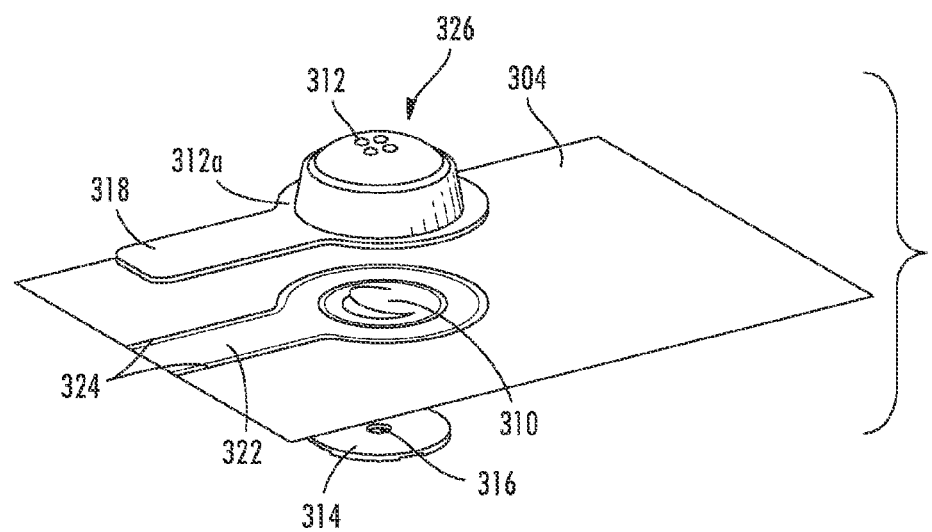
FIG. 11a is a front exploded perspective view of the metering dispensing system shown in FIG. 10.

FIG. 11a shows an exploded view of the top sheet 304 of material that forms a top portion of the storage container 320 and the metering pump 326 that are shown in FIG. 10. The metering pump 326 is installed onto a sheet of material 304, which serves as the top wall of the storage container 320. The sheet of material 304 includes a one way flapper valve 310, preferably of thin film construction, that may be configured to be normally open. Flapper valve 310 may also be configured to lay flat when at rest. Similar to that shown in FIG. 3, a metering housing 312, in the form of a flexible housing, is positioned above the one-way flapper valve 310. A base plate 314 with a flow aperture 316 therethough is positioned below the sheet of material 304 and the flapper valve 310. The base plate 314 may be convex to assist in operation of the pump 326, as will be described below. The flexible housing 312 and the base plate 314 are welded at their respective peripheries to the sheet 304 to form the pump construction. An additional length of material 318 is welded to the sheet of the material 304 at its longitudinal edges to create an exit pathway 322 for the dispensed liquid 302. The weld lines 324 are shown on the top sheet of material 304 to achieve this direction of flow of liquid 302. In this particular embodiment, the exit pathway 322 is positioned on the upper surface of the top sheet of material 304 that forms the storage container 320 for the dispensing device 300. Since the additional length of material 318 and the top sheet of material 304 lie very closely to one another, this structure also serves as an exit valve to prevent further unwanted flow of liquid 302 from the device 300.

Figure 11B:
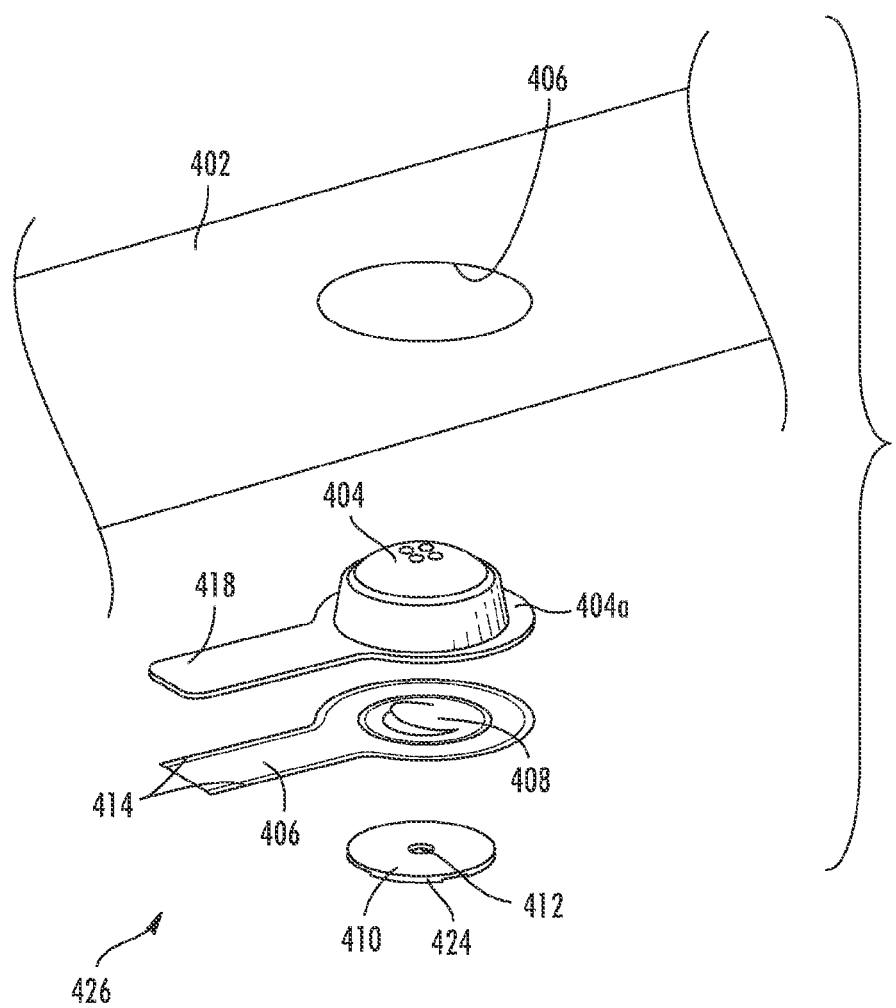
FIG. 11b is a front exploded perspective view of the metering pump mechanism formed as a standalone unit.

In this embodiment, the one way flapper valve 310 is integrated into the top sheet of material 304 of the storage container 320, as seen in FIG. 11a for welding of the flexible housing 312, base plate 314 and additional sheet of material 318 thereto. This length of material 318 may be attached to the top or bottom of the skirt 312a of housing 312. Length of material 318 may be extended (not shown) to include a ring of film material that is attached to the bottom of the skirt 312. It is also possible that the pumping mechanism be of a discrete standalone construction 426 that can be incorporated into a storage container body 320. FIG. 11b illustrates such a standalone pump construction 426 that can be installed under a sheet of a material 402 that forms a wall of the storage container (not shown). In that connection, the flexible dome housing 404 is preferably routed through an aperture 406 in the sheet of the material 402 and welded in place to skirt 404a, as desired. The exit pathway 406 and valve 408 can be welded to the sheet of material 402 along their respective longitudinal lengths at 414 to sheet 418. A base plate 410 with liquid flow through aperture 412 can also be welded to the bottom surface thereof. Or, the free end of the exit pathway 406 and valve can be welded on its opposing sides to the primary weld that seals the storage container, as seen in FIG. 10 so that the exit pathway co-terminates with the edge of the storage container 320.

Figure 12:
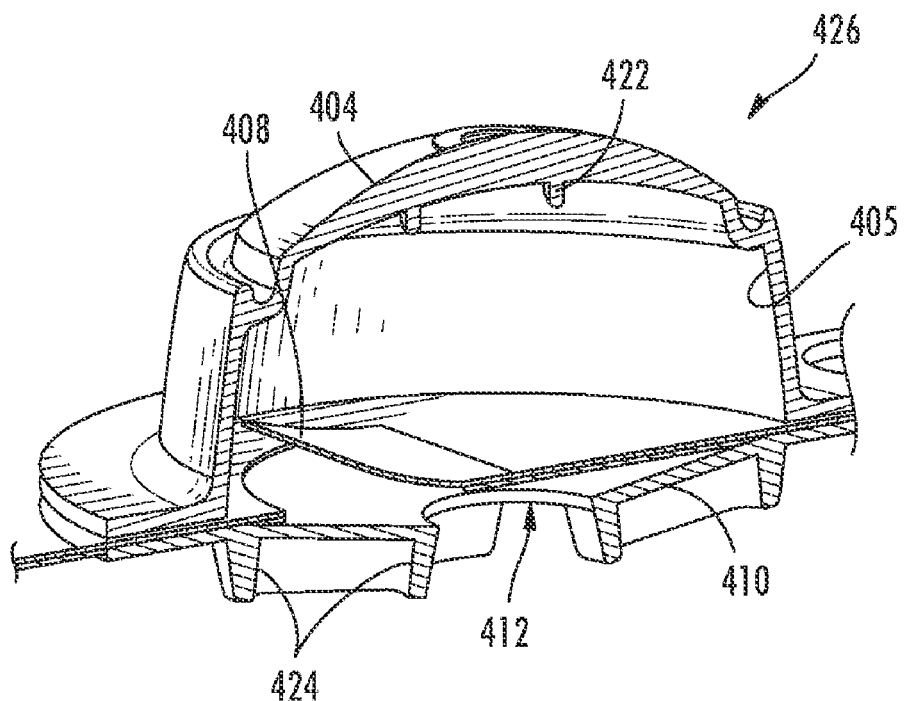
FIG. 12 is a perspective cross-sectional view, through the line 12-12 of FIG. 10, of the metering dispensing system of the present invention illustrating the improved valving.
Figure 13:
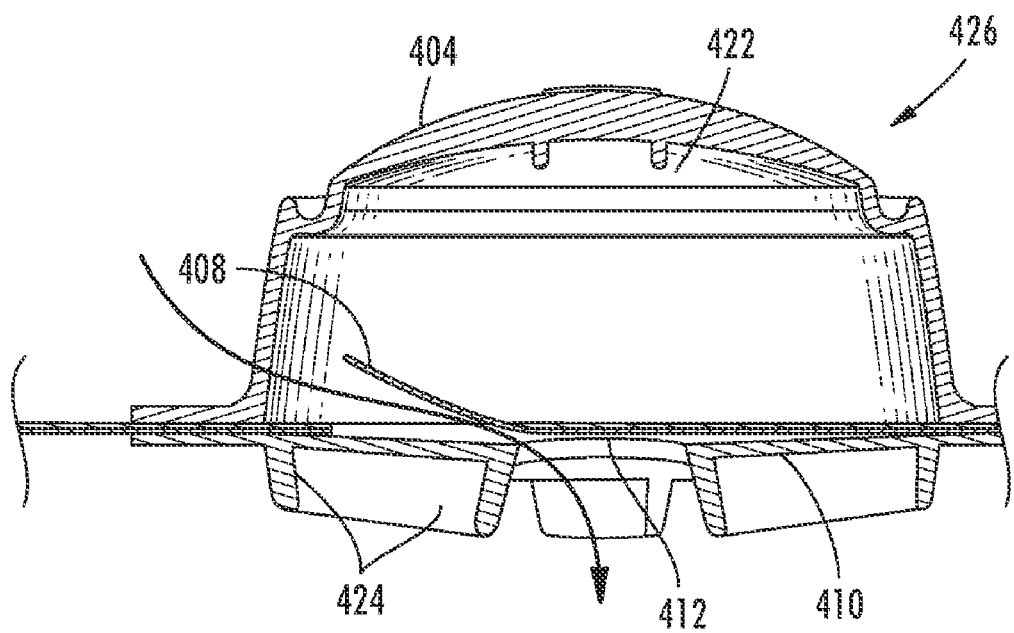
FIG. 13 is a cross-sectional view through the line 12-12 of FIG. 10.
Figure 14:
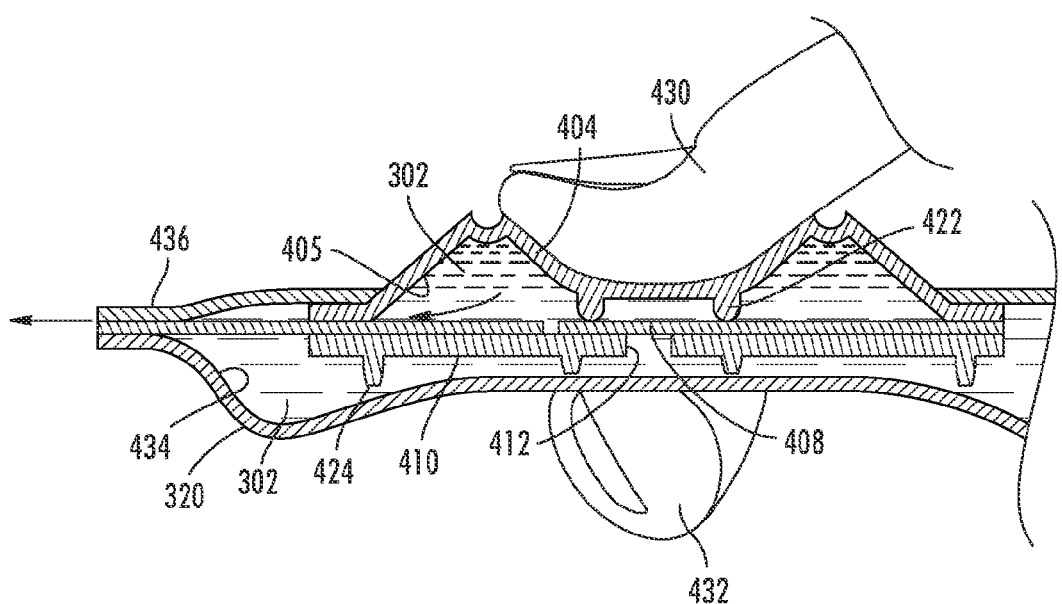
FIG. 14 is a cross-sectional view through the line 12-12 of FIG. 10 illustrating actual dispensing of the fluid.

Turning now to FIGS. 12-14 further details of the operation of the a standalone pump construction 426 with improved valving of the present invention is shown. Additional sheet of material is not shown for ease of illustration and for clarity. FIG. 12 illustrates a perspective cross-sectional view and FIG. 13 illustrates a cross-sectional view through the line 12-12 of FIG. 10. It is this valving that prevents any advertent or accidental dispensing of liquid 302 from the storage container 320 when pressure is accidentally or inadvertently applied to the dome pump housing 404. Stand-off legs 422 are provided on the underside of the top of the flexible dome pump housing 404 and the base plate 410 is provided in a convex configuration to ensure that the flow through aperture 412 through the base plate 410 is sealed only when desired. Stand-off legs 424 are also provided on the bottom of the base plate 410 to assist in sealing the one-way flapper valve 408 and to prevent a vacuum suction as described above.

More specifically, the dispensing operation actually requires application of force to the flexible dome housing 404 of the dome pump 426, as well as the stand-off legs 424 on the bottom of the base plate 410. Since it is unlikely that force would be inadvertently or accidentally applied to these two areas simultaneously, the likelihood of accidental or inadvertent dispensing of liquid is substantially eliminated.

In the dome pump 426 of the present invention, the base plate 410, through which the flow through aperture 412 passes, is preferably slightly convex, although it may be flat, if desired. Resting above the aperture 412 and within the cavity 405 of the dome is a flapper valve 408 of preferably thin film construction. It is possible that this flapper valve 408 be configured of a normally open condition but also may be configured to lie flat when at rest. As long as the plate 410 with the aperture remains convex, the flapper valve 408 does not seal against the aperture 412 such that any inadvertent contact with the flexible dome pump housing 404 does not result in the dispensing of the product. Instead, since the flapper valve 408 is open, liquid product residing inside the cavity 405 of the flexible pump housing 404 will tend to simply flow back through the inlet aperture 412 to the reservoir within the storage container itself, as indicated by the arrow in FIG. 13, rather than flow undesirably out through the exit valve to outside of the dispenser 400. In use, if a person has the dispenser in their pocket or purse and pressure is accidentally or unintentionally placed on the flexible housing 404 of the dome pump 426, liquid will not flow outside the dispenser thereby preventing a mess from being made due to unintentionally dispensed product.

FIG. 14 illustrates intentional dispensing of liquid 302. When it is desired to actually dispense the liquid product 302, the user's thumb 430 can depress the flexible dome 404 and the user's index finger 432 can invert the base plate 410 from convex to concave, by application of force against the stand-off legs 424, such that flexible dome 404, with the assistance of the stand-off legs 422 under the flexible dome, securely seals and provides a positive lock of the flapper valve 408 over and about the aperture 412 thereby closing the liquid flow passage back into the reservoir 434 of the storage container 320. It is also possible that the base plate 410 is concave and then is inverted to a convex configuration. Other fingers of the user may be used to carry out this operation. Thus, the only path for the liquid 302 contained within the cavity 405 of dome 404 is to exit through the one-way outlet valve 436 for intended dispensing of the product, as indicated by the arrows in FIG. 14.

It should be understood that the stand-off legs 422 on the bottom of the flexible dome housing 404 and the stand-off legs 424 on the bottom of the base plate 410 can be modified in size, length and configuration to adjust the amount of squeezing necessary by the user's fingers 430, 432 to effectuate sealing of the flapper valve 408. For example, preferably four stand-off legs 422 are provided on the bottom of the flexible dome housing 404 in a 2×2 array and can be ¹⁄₃₂ of an inch in length. It is also possible that these stand-off legs 422 can be a single downwardly depending wall, such as in the shape of a circle or square. Such an array is configured to downwardly press against the one-way flapper valve 408 outside of the diameter of the aperture 412 through the base plate 410 to provide a good seal of the flapper valve 408 to the base plate 410.

It should be understood that the operation of the 326 pump configuration of FIG. 11a is similar in operation to the pump 426 shown in FIGS. 11b through 14. The pump 326 of FIG. 11a may be installed onto a container, similar to pump 426, to controllably dispense liquid therefrom. More specifically, pump 326 is also operated in a fashion similar to pump 426 whereby flapper 310 is secured into a closed condition by the user's fingers as shown in FIG. 14. While the operation is the same as pump 426, the construction of pump 326 of FIG. 11a is slightly different, as described above, to best accommodate a given container environment.

Similarly, the amount of convexity of the base plate 410 can be modified to adjust the amount of squeezing pressure to carry out the sealing of the one-way flapper valve 408. Still further, it is possible that the stand-off legs 422 on the inside of the flexible dome 404 and/or the stand-off legs 424 on the bottom of the base plate 410 can be omitted depending on the required configuration of the pump 426 and the type of material to be dispensed.

Figure 15:
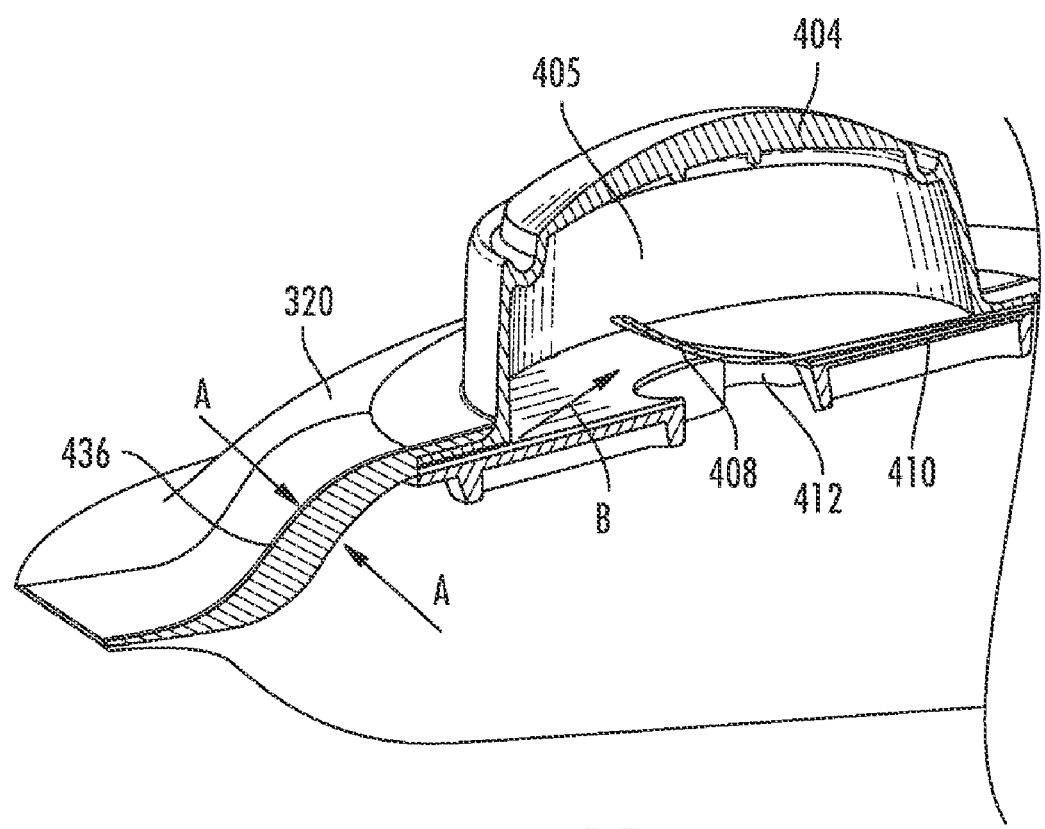
FIG. 15 is a perspective cross-sectional view, through the line 12-12, of the metering dispensing system of the present invention illustrating the creation of additional backflow through the exit channel by internal pressure to the one-way outlet valve.

Turning now to FIG. 15, the present invention provides further structure to prevent unwanted dispensing of liquid. In addition to the improved valving, as above, automatic shut-off of the exit port passageway 436, when pressure is exerted on the exterior of the storage container 320, serves to prevent leakage. In FIG. 15, when pressured is applied to the outside of the storage container or pouch 320, as indicated by arrows referenced A, the exit port passageway 436 tends to collapse, flatten and squeeze closed. As a result, any material residing in the passageway is urged back into the cavity 405 of the flexible dome housing 404, as indicated by arrow referenced B. As a result, unwanted leakage is prevented when accidental or unintentional pressure is placed on the storage container 320.

The embodiments of FIGS. 10-15 are well suited for providing controlled metered delivery of liquid 302 in an type of container or pouch dispenser configuration, such as stand-up pouches (SUP) gusseted pouches, printed pouches, reclosable zipper pouches as well as pouches and other vessels that include some type of tear away or punch hole exit port. For example, a hand cleaner dispenser with a tear away exit port would be particularly well-suited for pump configurations shown in FIGS. 10-15.

In general, the present invention can include valve geometry that can easily be modified to handle a large range of viscosities by, for example: 1) modifying the channel width 406; 2) creating backflow pressure through weld footprints; 3) modifying the shape of the channel 406; 4) modifying the size and shape of the flow aperture 412 through the base plate 410; 5) modifying the size, length and configuration of the stand-off legs 422 on the dome housing and the stand-off legs 424 on the bottom of the base plate 410; and 6) modifying the size, shape, flex and configuration of the one-way flapper valve 408. Also, the valve position can easily be modified to adjust the automatic shut-off pressure.

The dispensing device of the present invention has a wide array of applications of use to take advantage of the unique metered dosage capability of the present invention. Virtually any dispenser with any type of applicator material or combinations of applicator materials in different configurations can employ the present invention.

For example, the cleaning products and personal care industry has particular application in the controlled and metered dispensing of bath and shower gels. Also, medicines, cosmetics, hair care products, such a shampoos, skin care products, such as lotions, insect repellants and sunscreen products can employ the present invention. Also, various home products can be delivered in a device according to the present invention. These include products for furniture cleaning and polishing, tub and shower cleaning, floor cleaning and polishing, window cleaning, odor elimination, oven cleaning, laundry cleaning and apparel treatment. Also, air treatment devices can employ the present invention. Cleaning products can be dispensed in a controlled fashion, such as those for cleaning cars, bikes, planes and trucks. The food industry has numerous potent ional applications, particularly for the dispensing of condiments, sauces and vitamins.

Further, the location where the fluid material 24 is delivered to the surface of the device can be easily modified to suit the given application. For example, the material 24 can be delivered to the same side of the container 20 as in FIGS. 10 and 11 or to the opposing side, as in FIGS. 1-3. The materials used for the container 20 and the metering housing 26, while preferably flexible plastic, can be any suitable material for the application at hand. Also, the container 20 can be made of a different material than the metering housing 26.

In summary, a new and novel dispenser is provided that can deliver consistent metered dosages of fluid material 24. The dispenser 10 has a greatly improved construction where the fluid material 24 is evenly distributed throughout the applicator material 12 for a more efficient and more effective fluid dispensing. Improved valving prevents accidental or inadvertent dispensing of liquid when pressure is place on the flexible dome housing or body of the storage container pouch.

It would be appreciated by those skilled in the art that various changes and modifications can be made to the illustrated embodiments without departing from the spirit of the present invention. All such modifications and changes are intended to be covered by the appended claims.

What is claimed is:

1. A dispensing device, comprising:
   a base plate, having an upstream side and a downstream side, and defining a liquid flow aperture therethrough;
   a flap of material removably positionable over the liquid flow aperture and in sealing engagement with the downstream side of the base plate;
   a flexible pump housing, having an inner cavity and a flap contact surface on an inner wall, sealed to the downstream side of the base plate and positioned about the flap of material; the flexible pump housing and base plate further defining an exit port;
   the flexible pump housing being configured to draw liquid from the upstream side of the base plate, through the liquid flow aperture and into the inner flow cavity;
   the flexible pump housing being further configured to urge liquid through the exit port when the flap contact surface of the flexible pump housing has pressed the flap of material against the downstream side of the base plate to seal the liquid flow aperture to prevent flow of liquid therethrough.

2. The dispensing device of claim 1, wherein the base plate is of a convex configuration facing upstream; the base plate being deformable to a concave configuration upon exerting pressure on the upstream side of the base plate.

3. The dispensing device of claim 1, further comprising:
   at least one housing stand-off leg positioned on the flap contact surface.

4. The dispensing device of claim 1, further comprising:
   at least one base plate stand-off leg positioned on the upstream side of the base plate.

5. The dispensing device of claim 1, further comprising:
   an output valve positioned in fluid communication with the exit port.

6. The dispensing device of claim 1, further comprising:
   a storage container in fluid communication with the liquid flow aperture.

7. A method of pumping liquid, comprising the steps of:
   providing a base plate, having an upstream side and a downstream side, and defining a liquid flow aperture therethrough;
   removably positioning and sealing a flap of material over the liquid flow aperture with the downstream side of the base plate;
   sealingly connecting a flexible pump housing, having an inner cavity and a flap contact surface on an inner wall, to the downstream side of the base plate and about the flap of material;
   providing an exit port between the flexible pump housing and the base plate; drawing liquid from the upstream side of the base plate, through the liquid flow aperture and into the inner cavity;
   sealing the liquid flow aperture by depressing the flexible pump housing to move the flap contact surface to press the flap of material against the downstream side of the base plate; and
   urging flow of liquid through the exit port by further pressing the flexible pump housing.

8. The method of pumping liquid of claim 7, further comprising the steps of:
   providing a base plate of a convex configuration facing upstream;
   deforming the base plate to a concave configuration upon pressing by exerting pressure on the upstream side of the base plate.

9. The method of pumping liquid of claim 7, further comprising the steps of:
   providing at least one housing stand-off leg positioned on the flap contact surface;
   urging the at least one housing stand-off leg into the flap of material to seal it to the base plate and about the liquid flow aperture.

10. The method of pumping liquid of claim 7, further comprising the steps of:
    providing at least one base plate stand-off leg positioned on the upstream side of the base plate; pressing against the at least one base plate stand-off leg to urge the base plate from a convex to concave configuration.

11. The method of pumping liquid of claim 7, further comprising the step of:
    positioning an output valve in fluid communication with the exit port.

12. The dispensing device of claim 7, further comprising the step of:
    providing a storage container in fluid communication with the liquid flow aperture;
    pulling liquid from the storage container through the liquid flow aperture and into the inner cavity of the flexible pump housing.

13. A dispensing device, comprising:
a container maintaining a material to be dispensed;
a dome pump received by said container, said dome pump having an inlet in communication with an interior of said container, and an outlet in communication with an exterior of said container;
a first valve interposed between said inlet and said interior of said container; and
wherein activating forces applied concurrently to opposite sides of said dome pump activate said first valve to cause passage of material from said dome pump and through said outlet, and activating forces applied to only one side of said dome pump activate said first valve to cause passage of material from said dome pump into said container through said inlet.

14. The dispensing device of claim 13, wherein said first valve comprises a base plate having an aperture therethrough, and a flap of material selectively positionable over said aperture.

15. The dispensing device of claim 14, wherein said flap of material is selectively positioned by said activating forces.

16. The dispensing device of claim 15, wherein said base plate is of a normally concave configuration away from said flap.

17. The dispensing device of claim 13, wherein said container is a pouch.

18. The dispensing device of claim 17, further comprising:
a second valve interposed between said outlet and said exterior of said pouch.

* * * * *